United States Patent Office 2,952,695
Patented Sept. 13, 1960

2,952,695

A PROCESS FOR THE PREPARATION OF POLYMERIC BASIC ALUMINUM SALTS

Pieter L. Stedehouder and Wilhelmus J. C. Viveen, Parkweg, Deventer, Netherlands, assignors to Koninklijke Industrieele Maatschappij voorheen Noury & Van Der Lande N.V., Deventer, Netherlands, a corporation of the Netherlands No Drawing. Filed Oct. 3, 1956, Ser. No. 613,603

Claims priority, application Netherlands Oct. 6, 1955

5 Claims. (Cl. 260—414)

In the co-pending patent application Serial No. 564,870, filed February 13, 1956, a process has been described for the preparation of polymeric basic aluminium salts of organic acids according to which basic aluminium salts of the formula $(HO)_2$—Al—X are caused to react with dialkoxy aluminium salts $(RO)_2Al$—X', in which X and X' stand for equal or different organic acid radicals and R is an alkyl- or aryl-radical.

The reaction is preferably carried out in an inert organic solvent, such as e.g. xylene and mineral spirits, at increased temperature, for example 100–150° C., at which temperature an alcohol is split off viz. 1 mole of alcohol per 1 atom of aluminium.

The formation of the polymer can be represented by the following formula, in which, for convenience, X and X' are assumed to be identical:

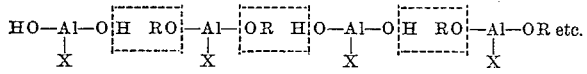

In this case, the empirical formula approaches $[O=Al—X]_n$.

Now it has been found, that the abovementioned polymeric basic aluminium salts of organic acids may also be prepared in another, simple way, i.e. by dehydration by means of distillation with an indifferent organic solvent, such as for example xylene, ethylbenzene and mineral spirits, of basic aluminium salts of the formula $(HO)_2Al$—X, in which X stands for an organic acid radical. The reaction is preferably carried out at temperatures between 100 and 200° C., at which temperatures 1 mole of water is split off per 1 atom of aluminium. The formation of the polymer can be represented as follows:

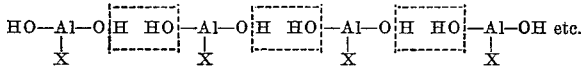

Thus, the empirical formula approaches $[O=Al—X]_n$, in which two —OH-groups are still attached to the ends of the molecule unless cyclisation has taken place. Because of the high values assumed by n, for example 50–100, it is not possible to ascertain, whether final —OH-groups are present.

Though X, taken very broadly, stands for an organic acid radical, particularly interesting compounds are obtained with fatty acids with naphthenic acids and with rosin acids, or with mixtures of such acids, for example tall oil. In order to obtain pure products, it is desirable to employ pure basic aluminium salts of the formula $(HO)_2Al$—X. These salts may for example be obtained by converting aluminium alcoholates with an organic acid into dialkoxy-aluminium salts and by converting the latter with water:

$Al(OR)_3 + HX \rightarrow (RO)_2Al$—X$+ROH$
$(RO)_2Al$—X$+2H_2O \rightarrow (HO)_2Al$—X$+2ROH$ The distillation may suitably be carried out under atmospheric pressure; if desired, the process may in certain cases take place at higher or at lower pressure. A suitable method of preparation, for example, involves a distillation method employing a solvent, immiscible with water at room temperature, so as to permit separation of water from the cooled distillate with recycling of the solvent to the reaction-zone. In this case, xylene may suitably be applied. During the process the starting-material is slowly converting into the polymeric basic aluminium salt, which in most cases enters into solution. It may be isolated by distilling off the solvent, preferably in vacuo.

The properties and possibilities for application of these compounds have already been described in the co-pending patent application Serial No. 564,870.

Example 1

327 g. of dihydroxy-aluminium stearate (1 mole) were distilled during 6 hours with 1800 ml. of dry xylene, while 17.8 g. of formed water distilled off and under simultaneous recycling of xylene in the reaction-zone (theoretically: 18 g. of water). During the reaction the powder entered slowly into solution.

After distillation of the solvent in vacuo, 308 g. of poly-oxoaluminium-stearate (theoretically: 309 g.) were obtained as a white-yellow, plastic, transparent mass. The aluminium-content was 8.75% (theoretically: 8.74%).

Example 2

336 g. of dihydroxyaluminiumoleate (1 mole) were heated in 2000 g. of mineral spirits during 6 hours, the solvent being distilled off. During the reaction, 17.7 g. of water (theoretically: 18 g.) was split off.

The solvent was distilled off from the solution obtained in vacuo, whereafter 320 g. of poly-oxoaluminiumoleate (theoretically: 318 g.) were obtained as a brown, plastic, transparent mass. The aluminium content was 8.46% (theoretically: 8.49%).

Example 3

190 g. of poly-oxoaluminium-octoate (theoretically: 190 g.) were obtained from 208 g. of dihydroxyaluminiumoctoate (1 mole) in the way as described in Example 1, as a white-yellow pulverisable solid mass. The aluminium content was 14.16% (theoretically: 14.21%). During the reaction 17.8 g. of water (theoretically: 18 g.) was split off.

What is claimed is:

1. A process for the preparation of polymeric basic aluminium salts of the formula

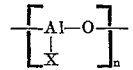

in which X stands for an unsubstituted carboxylic acid radical, and n is a large whole number between about 50 and 100 which comprises: distilling basic aluminium salts having the formula $(HO)_2Al$—X with an inert organic solvent which is immiscible with water at room temperature and continuing said distillation until water is split off and removed from said basic aluminium salts to form the said polymer.

2. A process for the preparation of polymeric basic aluminium salts of the formula

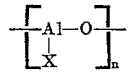

in which X stands for a stearic acid radical, and n is a large whole number between about 50 and 100 which comprises: distilling basic aluminium salts having the formula $(HO)_2Al$—X with an inert organic solvent which is immiscible with water at room temperature and continuing said distillation until water is split off and removed from said basic aluminium salts to form the said polymer.

3. A process for the preparation of polymeric basic aluminium salts of the formula

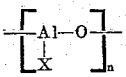

in which X stands for an oleic acid redical, and $n$ is a large whole number between about 50 and 100 which comprises: distilling basic aluminium salts having the formula $(HO)_2Al—X$ with an inert organic solvent which is immiscible with water at room temperature and continuing said distillation until water is split off and removed from said basic aluminium salts to form the said polymer.

4. A process for the preparation of polymeric basic aluminium salts of the formula

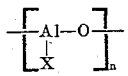

in which X stands for a 2-ethyl hexoic acid radical, and $n$ is a large whole number between about 50 and 100 which comprises: distilling basic aluminium salts having the formula $(HO)_2Al—X$ with an inert organic solvent which is immiscible with water at room temperature and continuing said distillation until water is split off and removed from said basic aluminium salts to form the said polymer.

5. A process for the preparation of polymeric basic aluminium salts of the formula:

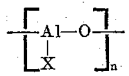

in which X stands for an unsubstituted carboxylic acid, and $n$ is a large whole number between about 50 and 100 which comprises: distilling basic aluminium salts having the formula $(HO)_2Al—X$ with an inert organic solvent selected from the group consisting of xylene, ethylbenzene and mineral spirits; and continuing said distillation until water is split off and removed from said basic aluminium salts to form the said polymer.

References Cited in the file of this patent

UNITED STATES PATENTS

| | | |
|---|---|---|
| 1,550,608 | Faragher et al. | Aug. 18, 1925 |
| 2,681,922 | Balthis | June 22, 1954 |
| 2,689,858 | Boyd | Sept. 21, 1954 |
| 2,702,792 | Ashley | Feb. 22, 1955 |
| 2,744,074 | Theobald | May 1, 1956 |

OTHER REFERENCES

Eigenberger et al.: Kolloid-Zeitschrift, vol. 91 (1940), pp. 287–294.

Groggins: Unit Processes in Organic Synthesis, 1952, page 760.